(No Model.) 2 Sheets—Sheet 1.
J. A. DODD.
SEED PLANTER.
No. 488,650. Patented Dec. 27, 1892.
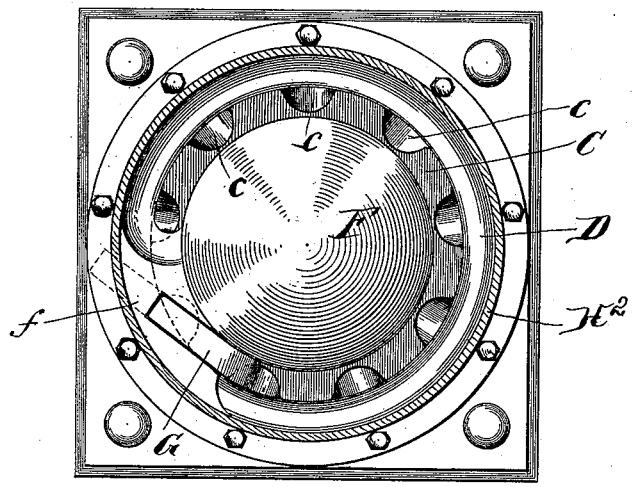
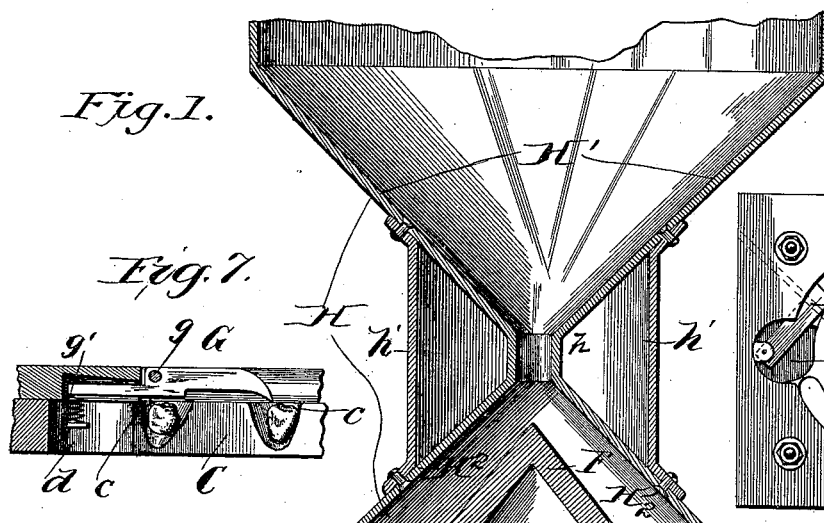
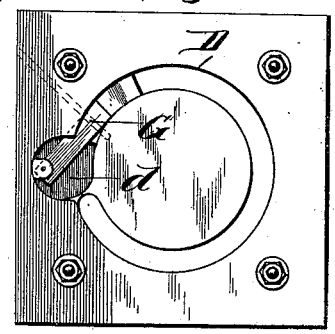
Witnesses:
Wm. N. Rheem
[signature]
Inventor:
John A. Dodd
By L. Rice
Atty (No Model.)
J. A. DODD.
SEED PLANTER.
No. 488,650.     Patented Dec. 27, 1892.
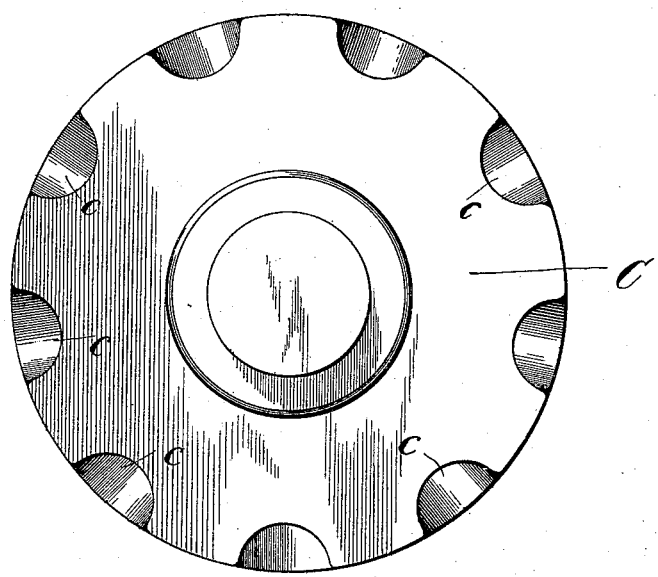
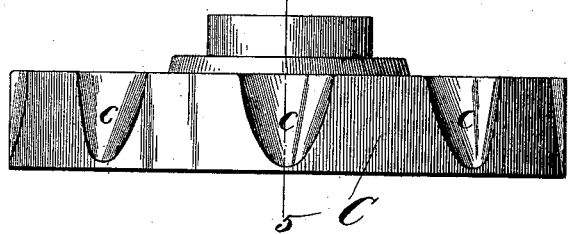
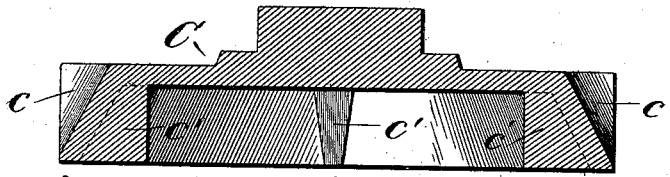
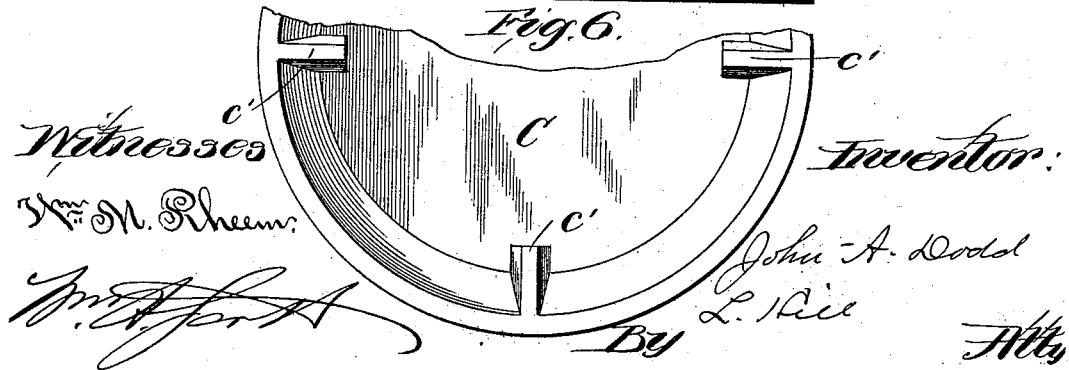
Witnesses
Wm. N. Rheem
[signature]
Inventor:
John A. Dodd
By L. Rice
Atty

UNITED STATES PATENT OFFICE.

JOHN A. DODD, OF GALVA, ILLINOIS.

SEED-PLANTER.

SPECIFICATION forming part of Letters Patent No. 488,650, dated December 27, 1892.

Application filed January 6, 1892. Serial No. 417,132. (No model.)

*To all whom it may concern:*

Be it known that I, JOHN A. DODD, a citizen of the United States of America, residing at Galva, in the county of Henry and State of Illinois, have made certain new and useful Improvements in Seed-Planters, of which the following is a specification.

Referring to the accompanying drawings, wherein like reference letters indicate like parts, Figure 1. is a vertical section of a seed box, showing my dropping device, and also in partial section; Fig. 2. a top plan, with seed box removed; Fig. 3. a top plan of the seeding disk; Fig. 4. a side elevation of the same; Fig. 5. a vertical section of the same, in line 5—5 of Fig. 4.; Fig. 6. a partial bottom plan of the same; Fig. 7. a vertical section showing the cut-off; and, Fig. 8. a bottom plan of the plate D.

In planters and drills, using a rotating dropping disk, great difficulty has been found in discovering a pocket or cell that is adapted to receive a single seed of any form or size from the mass of different sized and shaped seeds of the same kind, and exclude all others, and at the same time preclude all danger of clogging, or wedging, in the cell. It is obvious that to accomplish the desired result, the cell must be so formed as to receive the various shaped and sized seeds of any given kind, as, for example, in Indian corn, where the seed varies from the long, slender kernel to the short, plump one; the success of the future crop depending largely upon the certainty with which this is done. It is to this class of constructions that my invention properly belongs, and it is adapted to be used in planting various kinds of seeds, as Indian corn, peas, beans, broom-corn, sorghum, wheat, &c., requiring slight changes in degree only to adapt it to the sizes of the different species, and consequently can be embodied in any kind of machine that uses a rotating disk, whether for drilling, or hill planting. The machine I have tested it in, and which I show in my drawings, is a corn-planter of the check-row type.

In the drawings Fig. 1. shows a portion of the front part of an ordinary check-row corn-planter. A pinion attached to the end of a shaft which extends from one side or shoe to the other, is caused to revolve by any satisfactory arrangement, as by sprocket wheel and chain attachment to the axle of the rear part of the planter. The above mentioned pinion meshes with the pinion or crown-wheel B. upon which is fixed the disk C., causing them both to rotate in unison. The disk and crown-wheel may be caused to rotate together in any satisfactory manner, the manner in which I have accomplished this is to fit the shoulders $c'$. $c'$. in the lower surface of the disk into corresponding recesses in the upper surface of the crown-wheel.

In the periphery of the disk C. I construct the cells or pockets $c$. These pockets or cells are curved, in form, and extend slantingly from a point in the upper surface of the disk to the periphery of the same, the top outline being, in form, the arc of a circle, which, because of its slanting direction, is gradually and regularly decreased in length, in horizontal section, as it descends, until it terminates at the periphery as before said; the size varying upon different disks to accommodate the size of the seed to be planted.

In the horizontal plane of the disk C. I place the plate D., which contains a circular opening encircling and closely fitting the circumferential surface or periphery of the disk C. Thus forming a wall against which the periphery of the disk revolves, and so closing the open side of the cell $c$. At one point in the circular wall thus described is a break or opening $d$., opening downward into the channel E. of the shoe, at which point the seed, losing its support at the open side of the cell $c$., falls downward into said channel.

Firmly attached to the plate D., by its neck $f$., at or near the opening $d$., and adapted to cover the same, I attach the cone-shaped plate F., the apex of the said cone being in vertical line with the center of the disk C., the periphery of its base extending nearly or quite to the line of the inner portion of the cells $c$. $c$., and coming in such close contact as to prevent any of the seeds passing between the parts named. The incline of the cone F. is such that all seed falling upon it will slide to its base, and in line with the cells $c$. $c$.

Near the point where the disk C. passes under the neck $f$., I place the finger or cut-off G., fulcrumed at $g$., so as to allow a slight vertical movement at its inner end and controlled by the spring $g'$. at the reverse end; the vertical movement permitted not being sufficient to allow a seed, when out of the cell, to pass under it. There are many equivalents to this cut-off, and I do not wish to limit myself to the form herein shown.

Above the frame or plate D., and firmly attached thereto, I place the seed box H., which is divided into an upper chamber H'., and a lower chamber $H^2$., connected by the opening $h$. The walls of the chamber $H^2$., rising from the edge of the circular opening in the plate D., are inclined inwardly nearly in line with the incline of the cone F., leaving slightly more space between the said cone and the wall of the chamber, at the bottom, than at the top, to prevent any tendency to clog in said space. From the opening $h$., the upper chamber H'. diverges at a sufficient angle to insure all seed placed therein sliding downward to the opening $h$., and thus falling upon the cone F.; but the incline should also be such as to support the weight of the greater part of the seed placed therein, and the opening be of proper size to prevent clogging. By using this form of seed-box the weight of the seed does not come directly upon the cone and disk; and therefore there is less friction and wear upon the parts, allowing at all times a steady and regular action to the parts.

By using the ordinary valve at the bottom of the channel E., and a common check-row attachment, the machine is adapted to hill planting, the number of seeds to be deposited in each hill being regulated by the number and proximity of the cells in the disk, and the speed at which it is rotated. The supports $h'$. are designed to strengthen and support the seed box. I prefer using a circular box.

My invention is applicable to a drill for seeding wheat and similar grains, and to garden drills.

It is obvious that my form of cell can be applied to a vertically-revolving disk, in which case the circular or upper part of the cell is at the periphery, terminating at the vertical surface, which revolves against a wall, the seed being presented to the periphery of the disk at its upper part. Slight mechanical changes being necessary to adapt it to its new position. I have tested the disk in various positions, vertically, horizontally and inclined, but prefer the horizontal position as giving the best results.

The mode of operation is as follows:—The seed being placed in the box H., and the cover adjusted, the machine is ready for use. The seed, by force of gravity, falls through the opening $h$., upon the cone F., sliding to the base of the same, and by the form of the chamber $H^2$. is confined between the wall of said chamber and the cone, resting upon the exposed part of the revolving disk C., and in line with the cells $c. c.$, a single seed falling into one of the cells is, by the curved form of the latter, caused to seek and fully occupy the center of said cell, not leaving sufficient room for the entrance of another seed, the cut off or finger G. sweeping off or preventing any seed, except the one occupying the cell, from passing under said cut-off. The revolution of the disk brings the seed laden cell to the break or opening $d$. in the plate D., where it falls downward into the channel E., as set forth.

It is absolutely essential to my invention that the cell should be curved in all its cross-section, and should taper downward, with its inner wall inclining downward and outward to the edge of the disk, in order to satisfactorily accomplish the results herein described.

Having thus described my invention, what I claim as new, and desire to secure by Letters-Patent, is:—

1. In a planter or drill, the combination of a rotating dropping disk, having in the periphery thereof a series of shells which shall in form conform to the external surface of an inverted segment of a cone, said segment being formed by a line cutting it vertically, and not being greater than one-half of said cone; with a surface or wall against which said disk revolves, said wall serving to close the open or vertical side of said cells; substantially as set forth.

2. In a planter or drill, the combination of the seed box H, having the tapering sections H', $H^2$, with the contracted passage between them, the conical-deflector F, arranged centrally under the passage, the plate D, and the horizontally rotating disk C, having pockets for the delivery of the seed into the seed-spout E; substantially as and for the purposes set forth.

JOHN A. DODD.

In presence of—
 E. A. SHERBURNE,
 JOHN W. HILL.